United States Patent [19]

Komorowski

[11] Patent Number: 4,824,421

[45] Date of Patent: Apr. 25, 1989

[54] BELT TENSIONER WITH RELEASABLE BELT LOAD DAMPING

[75] Inventor: Jacek S. Komorowski, Weston, Canada

[73] Assignee: Litens Automotive Partnership, Woodbridge, Canada

[21] Appl. No.: 90,495

[22] Filed: Aug. 28, 1987

[51] Int. Cl.[4] .............................................. F16H 7/12
[52] U.S. Cl. .................................... 474/135; 474/112
[58] Field of Search ............... 474/135, 133, 111, 109, 474/112, 101; 384/125, 129, 192–194, 205, 275

[56] References Cited

U.S. PATENT DOCUMENTS

| | | | |
|---|---|---|---|
| 4,077,272 | 3/1978 | Busso | 474/110 |
| 4,473,362 | 9/1984 | Thomey | 474/112 |
| 4,551,120 | 11/1985 | Thomey | 474/135 |
| 4,634,407 | 1/1987 | Holtz | 474/112 |
| 4,661,087 | 4/1987 | Henderson | 474/135 |
| 4,725,260 | 2/1988 | Komorowski et al. | 474/135 |

Primary Examiner—Thuy M. Bui
Attorney, Agent, or Firm—Cushman, Darby & Cushman

[57] ABSTRACT

A belt tensioner having a sleeve bearing pivotally mounting a pivoted structure on a fixed structure for spring pressed movement between first and second positions. The sleeve bearing is larger than and surrounds a ball bearing assembly rotatably mounting a pulley on the pivoted structure. The pulley has a cantilevered rim which axially overlaps and annularly surrounds the sleeve bearing. One of the structures and the sleeve bearing have slidably interengaging surfaces which are compressed together by the belt load force in the pivoted structure and the reactionary force acting in the fixed structure so as to provide a damping torque resistance to the pivotal movement of the pivoted structure which prevents movements resulting from dynamic changes in the belt load force within a range. The arrangement is such that independent vibrational forces instantaneously release the damping torque resistance to permit instanteneous movements otherwise prevented.

39 Claims, 3 Drawing Sheets

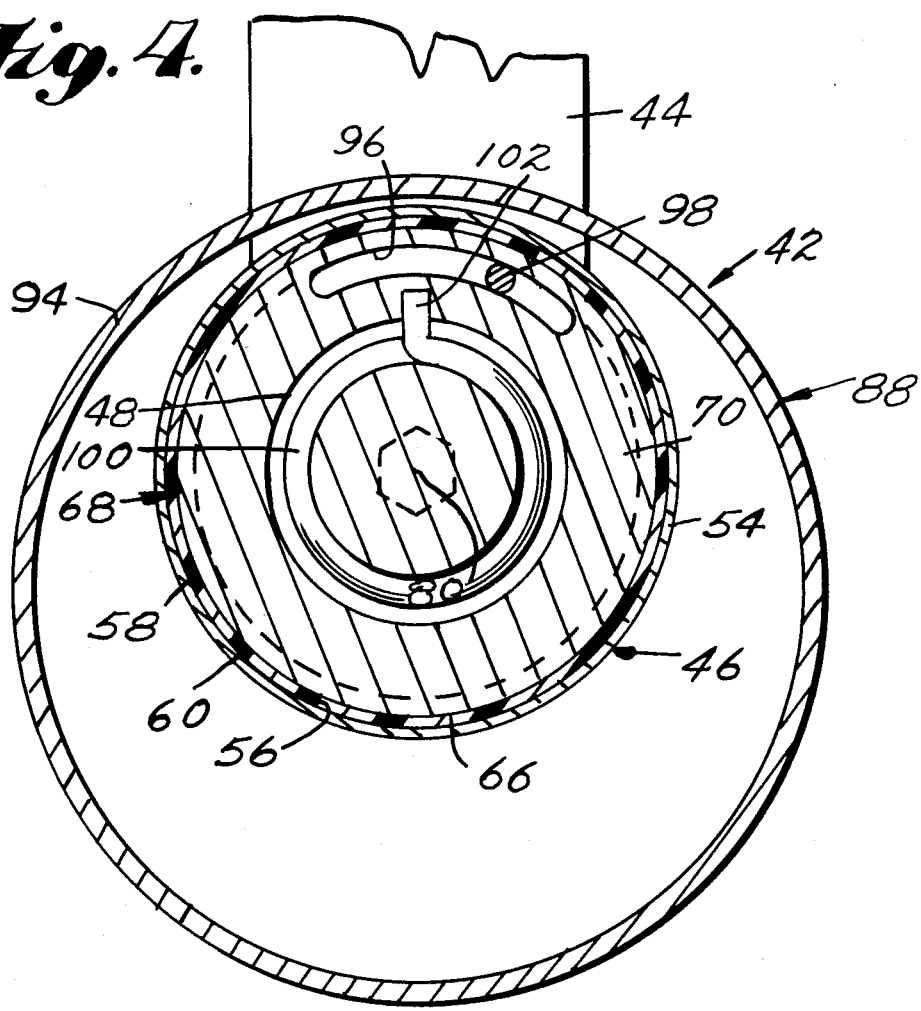

BELT TENSIONER WITH RELEASABLE BELT LOAD DAMPING

This invention relates to belt tensioners and more particularly to belt tensioners of the type used in automotive engine serpentine belt systems and timing belt systems.

A typical belt tensioner includes a fixed structure, a pivoted structure mounted on the fixed structure by a pivot bearing for pivotal movement about a pivotal axis and a belt tensioning pulley mounted on the pivoted structure by a rotational bearing for rotational movement about a rotational axis parallel with the pivotal axis. A torsion spring is provided for resiliently biasing the pivoted structure to pivot from a first limiting position corresponding to a loosened belt mounting position toward a second position during which the belt is engaged and tensioned. The torsion spring applies a torque to the pivoted structure which when the belt is tensioned is equal and opposite to a belt load torque. The spring torque decreases as the pivoted structure moves from its first position toward its second position and so does the belt load torque. While the belt load torque decreases over the range of movement provided, it is desirable that the belt load force and hence the belt tension be maintained relatively constant throughout the range of movement provided. The pulley is positioned with respect to the belt such that the lever arm through which the belt load force acts decreases as the pivoted structure moves from the first position to the second position so as to maintain the static belt load force substantially constant. In this way, the belt tensioner operates to maintain a constant static belt tension throughout a range of movement capable of accommodating belt wear and extension.

When the belt is moved, the dynamic belt load force acting on the tensioning pulley varies from the static load force resulting in movements away from the static equilibrium position which are either resisted by or effected by the torque applied by the spring. If this resilient movement is allowed to take place without control, a resonant vibratory movement of the pulley can ensue with disastrous results. Such control has heretofore been provided by providing a separate mechanism which provides sufficient resistance to pivotal movements of the structure as to dampen the same and thus prevent damage due to resonant vibratory movements.

A tensioner embodying such a separate damping mechanism which has been widely used in commercial automotive applications is disclosed in U.S. Pat. No. 4,473,362. The damping mechanism which provides the necessary resistance to pivoting, operates on the principle of utilizing sliding surface friction as the means to provide the damping resistance. The magnitude of the resistance is a function of the forces creating the pressure between the surfaces providing the sliding friction, the coefficient of friction of the surfaces, and the radial distance from the pivotal axis to the friction surfaces. Since the torque provided by the spring decreases as the position of the pivoted structure approaches the second position, in order to provide optimum damping, it was recognized as desirable to similarly vary the damping torque resistance. The resultant proportional damping, as disclosed in the aforesaid patent, is accomplished by providing a spring support which applies a component of the spring force through the sliding surfaces. In this way, the pressure between the surfaces varies as the spring pressure and, since the coefficient of friction and lever arm are otherwise constants, the damping torque resistance is proportional to the spring pressure torque.

Proportional damping in accordance with the principles enunciated in U.S. Pat. No. 4,473,362 has the distinct advantage that damping could be maximized throughout the operating range of the pulley without the occurrence of hang-ups as the operating position of the pulley approached the second position. A disadvantage of separate proportional damping is that the resistance to pivotal movement or damping torque acts with essentially the same magnitude in both directions of pivotal movement. Since pivotal movement in the direction toward the second position occurs as a result of the spring torque, the resistance or damping torque thus had to be limited to a value below the spring torque to an extent necessary to accommodate coefficient of friction increases which may occur due to atmospheric conditions in order to prevent hang-up. Consequently, a significant amount of pulley movement occurred during operation even though such movement was adequately controlled. The sliding friction which occurred during such movement also resulted in wear. Consequently, a greater useful life could be secured, if the amount of operative movement could be restricted.

The damping arrangement disclosed in commonly assigned United States patent application, Ser. No. 029,695, filed Mar. 24, 1987, now U.S. Pat. No. 4,725,260, constituted an effort to achieve less operative movement. The principle disclosed in the application for achieving this result is to apply the pressure between the sliding friction damping surfaces in such a manner that there is a greater gripping action or pressure applied in one direction of movement than the other. Specifically, the mechanism for carrying out the principle constituted a band brake. In one embodiment, the band brake was mounted in series with the torsion spring so that proportional damping was available when movement did occur. In a second embodiment, the band brake is mounted by a separate spring which allowed the dynamic vibrations incident to engine operation and belt movement to be used to release the gripping action under dynamic loading conditions.

In all of the prior art belt tensioners, it has been recognized that the reactionary force which acts through the pivot bearing to resist the belt load force imposed on the tensioning pulley established some resistance to pivotal movement. However, the effort in the past has been to make the pivot bearing small in diameter size and of antifriction material to minimize wear and insure a long bearing life. Consequently, the resistance provided was insignificant compared with the amount of resistance required to accomplish effective damping. The need to provide a separate mechanism which functions to provide the required additional dominant damping resistance introduced a complexity and cost which it would be desirable to eliminate.

It is an object of the present invention to provide a belt tensioner which achieves all of the advantages of the belt brake type tensioner while at the same time eliminating the complexity and cost factor introduced by virtue of the provision of a separate damping mechanism. In accordance with the principles of the present invention, this objective is accomplished by providing a belt tensioner which provides interengaging surfaces arcuate about a fixed pivotal axis parallel with the rotational axis of the pulley so as to slide relative to one another and define the pivotal movements of the pivoted structure with respect to the fixed structure between a first position wherein the pulley can be transversely aligned with a loosely trained belt and a second position. A spring resiliently biases the pivoted structure in a direction toward the second position with a spring torque which varies as the position of the pivoted structure approaches the second position. The pulley is manually movable into the first position against such resilient bias so that upon manual release the resilient bias moves the pulley into an intermediate operating static equilibrium position wherein the spring torque is equal and opposite to a belt load torque which varies with the variation in the spring torque as the intermediate operating position approaches the second position due to belt elongation by maintaining the belt load force acting on the pulley generally constant and varying the lever arm to the pivotal axis through which the belt load force acts. Preferably, the spring is mounted with respect to the pivoted structure such that the resultant spring torque is balanced in the radial direction with respect to the pivotal axis. Moreover, the position of the pivotal axis and the rotational axis are so related to the position of the engagement of the pulley with the belt when the tensioner is in operation that the belt load force transmitted to the pivoted structure is resisted by a reactionary force created in the fixed structure thereby compressing the interengaging surfaces together so as to establish a damping torque resistance which is a function of the fixed distance between the arcuate interengaging surfaces and the pivotal axis, the coefficient of friction with respect to the materials defining the interengaging surfaces and the magnitude of the belt load and reactionary forces. Finally, the materials defining the interengaging surfaces have a design static coefficient of friction such that pivotal movements of the pivoted structure (1) in a direction toward the first position by the belt load torque as a result of dynamic increases in the belt load forces and (2) in a direction toward the second position by the spring torque as a result of dynamic decreases in the belt load force are prevented so long as the surfaces remain immobile with respect to one another and the reactionary force is of a magnitude above the predetermined percentage of the constant belt load force, the arrangement being such that vibratory forces independent of the dynamic belt load forces instantaneously release the damping torque resistance either by mobilizing the surfaces so as to reduce the coefficient of friction function from static to dynamic or reducing the reactionary force or both so as to enable instantaneous pivotal movements to take place which would otherwise be prevented.

Preferably the independent vibratory forces which release the damping torque resistance are provided by an automotive internal combustion engine. Consequently, in accordance with the principles of the present invention, there is provided a novel combination which includes an internal combustion engine including an engine frame subject to vibrational forces resulting from the operation of the internal combustion engine, a plurality of shafts mounted for rotational movement about parallel axes fixed with respect to the engine frame, a plurality of pulleys fixed to the plurality of shafts, one of the plurality of shafts constituting the output shaft of the internal combustion engine, an endless flexible belt of a size capable of being loosely trained about the plurality of pulleys, and a belt tensioner. The belt tensioner comprises a fixed structure fixed with respect to the engine frame, a pivoted structure, and a belt tensioning pulley mounted on the pivoted structure for rotational movement about a rotational axis. The pivoted structure is mounted on the fixed structure for pivotal movement about a fixed pivotal axis parallel with the rotational axis between a first position and a second position. A spring resiliently biases the pivoted structure in a direction toward the second position with a spring torque which varies as the position of the pivoted structure approaches the second position so that the belt tensioning pulley is biased into an intermediate operating static equilibrium position in tensioning engagement with the belt wherein the spring torque is equal and opposite to a belt load torque which varies with the variation in the spring torque as the intermediate operation position approaches the second position due to belt elongation by maintaining the belt load force generally constant and varying the lever arm to the pivotal axis through which the belt load force acts. The pivotal movements of the pivoted structure are damped as a result of dynamic belt load forces varying from the generally constant belt load force when the belt is moving by sliding friction surfaces which establish a damping torque resistance sufficient to restrict the pivotal movements of the pivoted structure by virtue of the pressure of interengagement of the sliding friction surfaces and the position of interengagement of the sliding friction surfaces from the pivotal axis to an extent such that movements in response to dynamic changes in the belt load force within a range of changes are prevented. The arrangement is operable in response to the vibrational forces to which the engine frame is subject to instantaneously release the damping torque resistance to a level permitting instantaneous pivotal movements in response to dynamic changes in the belt load force which would otherwise be prevented by the sliding friction surfaces as being within the range of changes.

An advantage which accrues as a result of the increase in the size of the pivot bearing is that it can be made large enough to surround the rotational bearing thus enabling the belt tensioner to be readily axially balanced. Axially balanced arrangements are known and exemplified by U.S. Pat. Nos. 4,077,272, 4,551,120, and 4,634,407. However, in all of these prior art arrangements, the rotational bearing is of a size greater than the pivotal bearing. Traditionally, the rotational bearing is a ball bearing assembly which increases substantially in cost as size increases, whereas the pivotal bearing is traditionally a sleeve bearing which does not increase in cost with increase in size to the same extend as a ball bearing assembly. Consequently, in accordance with the principles of the present invention there is provided a belt tensioner which includes a fixed structure including a fixed pivotal bearing portion defining a fixed pivotal bearing surface arcuate about a fixed pivotal axis. The fixed pivotal bearing portion extends in cantilevered fashion in one axial direction. The pivoted structure includes a movable pivotal bearing portion having a movable pivotal bearing surface disposed in axially lapped opposed relation with respect to the fixed pivotal bearing surface and a pivoted annular bearing portion defining a rotational axis parallel with the pivotal axis. The pulley includes a radially extending wall, an annular belt engaging wall concentric with the rotational axis and extending axially from an outer portion of the radially extending wall in cantilevered fashion in an axial direction opposed to the one axial direction and a rotational annular bearing portion concentric with the rotational axis extending axially from an inner portion of the radially extending wall in cantilevered fashion in the opposed axial direction and in axially lapped opposed relation with respect to the pivoted annular bearing portion. The rotational bearing between the annular bearing portions mounts the pulley on the pivoted structure for rotational movement about the rotational axis. The pivotal bearing between the fixed and movable pivotal bearing surfaces mounts the pivoted structure on the fixed structure for pivotal movement about the fixed pivotal axis between a first position wherein the pulley can be transversely aligned with a loosely trained belt and a second position. The pivotal bearing has exterior and interior bearing surfaces engaging the fixed and movable pivotal bearing surfaces, the exterior and interior bearing surfaces being disposed in an annular plane surrounding the rotational bearing and the annular bearing portions. The belt engaging annular wall extends in axially lapped surrounding relation with respect to the pivotal bearing and the rotational bearing such that the belt load force acting on said pulley is transmitted to said pivoted structure through said rotational bearing means so as to establish a belt load force in said pivoted structure opposed by an equal and opposite reactionary force in said fixed structure transmitted to said pivotal bearing means in an axially balanced fashion.

Another object of the present invention is the provision of a belt tensioner of the type described which is simple in construction, effective in operation and economical to manufacture.

These and other objects of the present invention will become more apparent during the course of the following detailed description and appended claims.

The invention may best be understood with reference to the accompanying drawings wherein illustrative embodiments are shown.

IN THE DRAWINGS:

FIG. 4 is a sectional view taken along the line 4—4 of FIG. 2;

FIG. 6 is a side elevational view of the belt tensioner shown in FIGS. 2-4 with parts broken away to show a modified form of damping torque resistance releasing mechanism.

Figure 1:
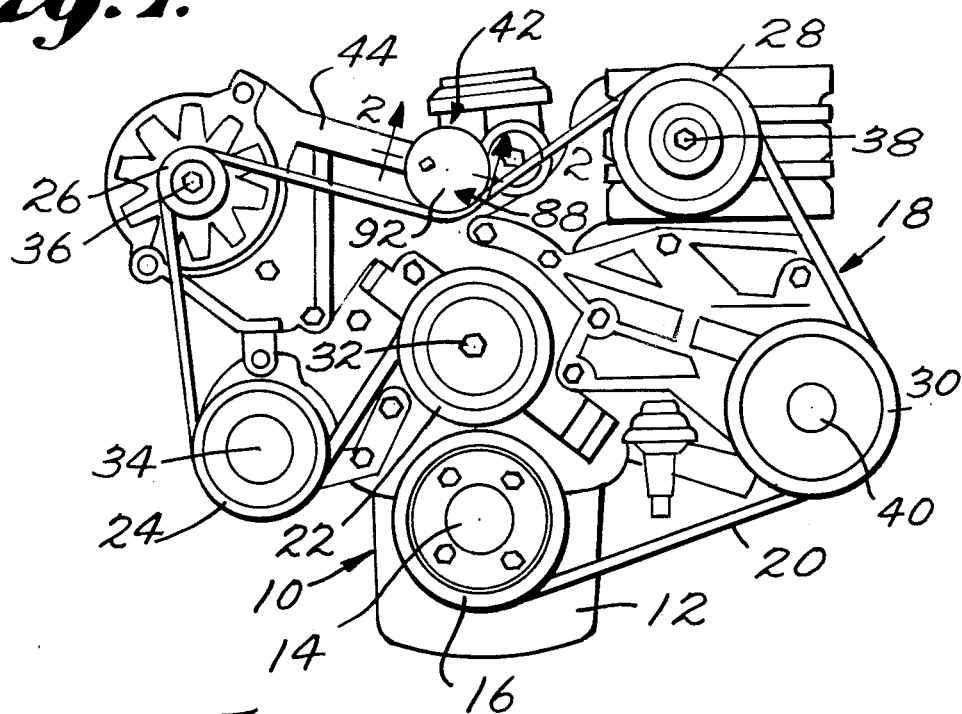
FIG. 1 is a front elevational view of an automotive internal combustion engine having a serpentine belt system including a belt tensioner embodying the principles of the present invention.

Referring now more particularly to the drawings, there is shown in FIG. 1 an automotive internal combustion engine, generally indicated at 10, which includes a engine frame 12 and an output shaft 14. Fixed to the output shaft 14 is a drive pulley 16 forming a part of a serpentine belt system, generally indicated at 18. the belt system 18 includes an endless belt 20. The belt 20 is of the thin flexible type, as, for example, a poly-V belt. The belt 20 is trained about the drive pulley 16 and a plurality of further pulleys 22, 24, 26, 28, and 30 each of which is fixed to respective shafts 32, 34, 36, 38, and 40. The shafts are connected to operate various engine accessories. For example, shaft 32 drives a power steering device, shaft 34 an engine water pump, shaft 36 an air pump of the type used in an anti-pollution system for the engine, shaft 38 an engine electrical alternator, and shaft 40 a compressor of an air conditioning system for the automobile utilizing the engine 10.

It will be understood that the internal combustion engine 10 may be of any known construction. In accordance with conventional practice, the operation of the engine is such as to impart vibratory forces to the engine frame 12. All of the accessories are mounted on the engine frame 12 so that the shafts are rotated about parallel axes which are fixed with respect to the engine frame 12 and parallel with the output shaft 16 thereof. The belt 20 is tensioned by a belt tensioner, generally indicated at 42, which embodies the principles of the present invention. The belt tensioner 42 is also mounted on the engine frame 12. It will be understood that the engine frame 12 is mounted on the chassis of the automotive vehicle through appropriate shock absorbing mounts which serve to isolate the vibratory forces which are established by the operation of the internal combustion engine from the vehicle frame but not from the engine frame. As will be more fully explained hereinafter, the vibratory forces which are established by the operation of the internal combustion engine 10 to which the engine frame 12 is subjected are also transmitted to the belt tensioner 42 through the fixed mount thereof.

Figure 2:
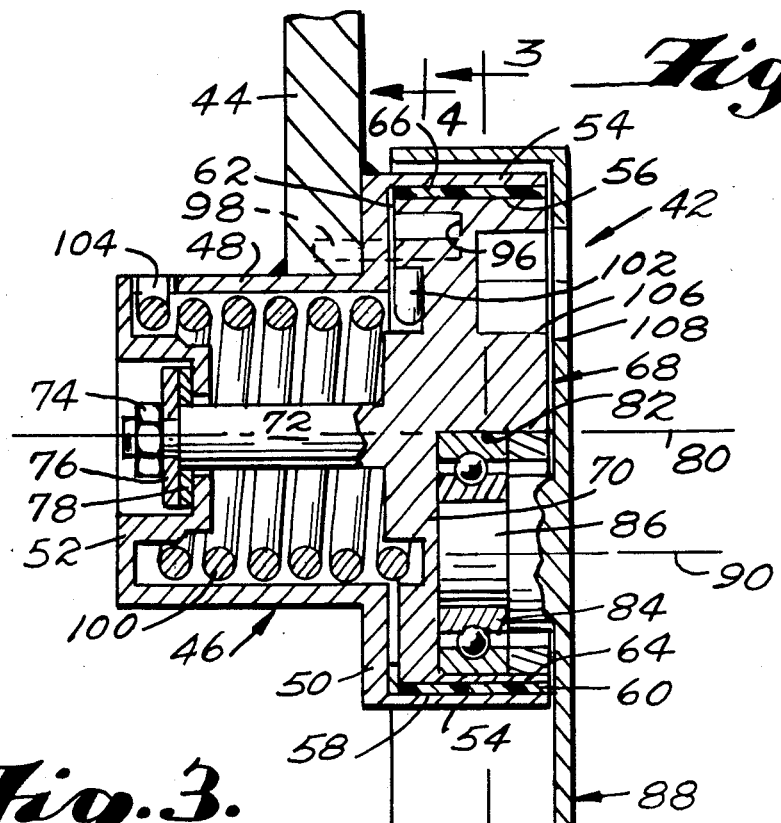
FIG. 2 is an enlarged fragmentary sectional view taken along the line 2—2 of FIG. 1.
Figure 3:
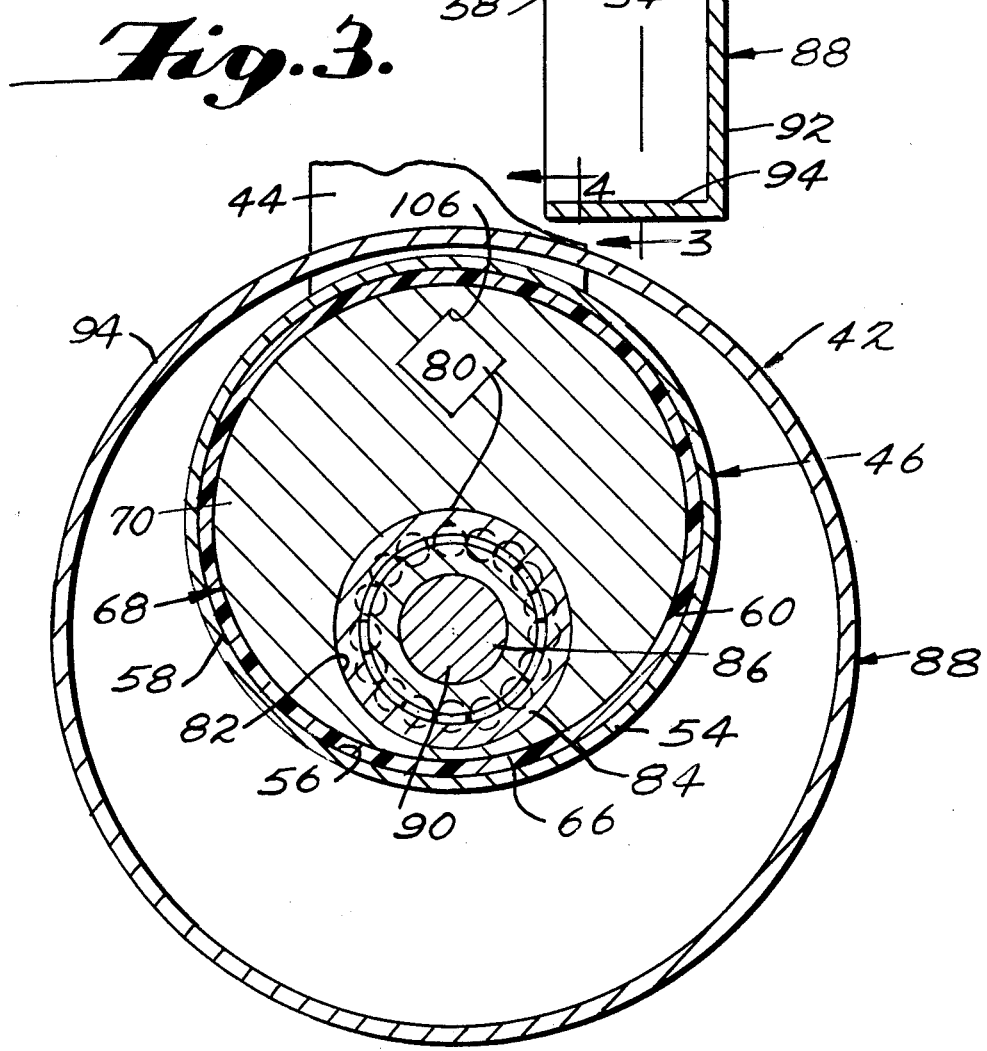
FIG. 3 is a sectional view taken along the line 3—3 of FIG. 2.

As shown the fixed mount is in the form of a bracket 44 fixed at one end to the engine frame 12 and its other end to a fixed structure, generally indicated at 46, forming a part of the belt tensioner 42. As best shown in FIG. 2, the fixed structure 46 is in the form of an annular member including a cylindrical wall portion 48, having a radial wall portion 50 extending radially outwardly from one end thereof and an end wall portion 52, which is centrally recessed and apertured extending radially inwardly from the opposite end thereof. Extending axially outwardly in cantilever fashion from the outer periphery of the radial wall portion 50 is an annular bearing wall portion 54 which is generally of cylindrical configuration. The bearing portion 54 includes an interior cylindrical bearing surface 56 disposed in engagement with an exterior peripheral bearing surface 58 of a sleeve bearing 60.

As shown, the sleeve bearing 60 includes an rearward radially inwardly extending flange 62 which engages the adjacent surface of the radial wall portion 52 of the fixed structure 46. The sleeve bearing 60 also includes an interior peripheral bearing surface 64 which engages an exterior cylindrical bearing surface 66 of a pivoted structure, generally indicated at 68. It will be understood that the sleeve bearing 60 can have its surfaces relieved in accordance with the teachings contained in the aforesaid application, the disclosure of which is hereby incorporated into the present specification. Moreover, while it is preferred that the surfaces 66 and 64 be slidable and the surfaces 56 and 58 fixed, it will be understood that the slidable and fixed relationship can be reversed or both could be made slidable.

The pivoted structure 68 generally consists of an annular member 70 having a stem 72 extending rearwardly from one end thereof. The end of the stem 72 is of reduced diameter and threaded to receive a locking nut 74. The locking nut 74 serves to engage a rigid washer 76 which, in turn, engages an annular washer 78 of flexible material, as, for example, Zytel or the like. The annular washer 78 serves to maintain the axial alignment of the pivoted structure 68 with the fixed structure 46 in a forward direction, whereas the flange 62 of the sleeve bearing 60 maintains axial alignment in the opposite direction. It can be seen that by virtue of the sliding pivotal movement of the exterior peripheral bearing surface 66 of the pivoted structure 68 with the interior peripheral bearing surface 64 of the sleeve bearing 60, the pivoted structure 68 is confined to pivot with respect to the fixed structure 46 about a pivotal axis 80 (shown in phantom lines in FIG. 2) which is coincident with the axis of the stem 72. Formed in the forward portion of the pivoted structure 68 in radially offset relation with respect to the pivotal axis 80 is a cylindrical recess 82 within which is mounted a ball bearing assembly 84. The ball bearing assembly 84 serves to rotatably mount a stepped hub portion 86 of a belt tightening pulley, generally indicated at 88, for rotational movement about a rotational axis 90 (shown in phantom lines in FIG. 2) which is disposed in parallel relation with the pivotal axis 80. As best shown in FIG. 2, the pulley 88 also includes a circular wall 92 which is concentric with and extends radially outwardly from the hub portion 86 and is disposed forwardly adjacent the forward end of the pivoted structure 68 and the outer bearing portion 54 of the fixed structure 46. Extending axially rearwardly in cantilever fashion from the outer periphery of the circular radial wall 92 of the pulley 88 is an annular wall or rim portion 94 which serves to engage the belt 20 in the serpentine belt system 18. It will be noted that the rim portion 94 of the pulley 88 is disposed in axially overlapping and annularly surrounding relation with respect to the outer annular bearing portion 54 of the fixed structure 46 and the sleeve bearing 60 which, in turn, is disposed in axially overlapping and annularly surrounding relation with respect to the ball bearing assembly 84 and the rotational axis 80 defined thereby. As shown in FIGS. 2 and 4, the pivoted structure 68 is formed with an arcuate slot 96 on its rearward portion within which extends a stop pin 98 suitably fixed to the mounting bracket 44 and the radial wall portion 50 of the fixed structure 46. The engagement of the pin 98 within the slot 96 serves to limit the pivotal movement of the pivoted structure 68 with respect to the fixed structure 46 between first and second positions which have an arcuate extent of approximately 70°.

In accordance with conventional practice, the pivoted structure 68 is resiliently biased to move in a direction toward its second position by a torsional coil spring 100. As best shown in FIG. 2, the rearward surface of the pivoted member 70 is recessed to receive one end of the torsional spring 100 which is bent upwardly, as indicated at 102, and engaged within a radial slot communicating with the recess. The opposite end of the torsional spring is bent upwardly, as indicated at 104, to engage within an opening formed in the rearward end of the cylindrical wall portion 48.

It can be seen that by virtue of the connection of the torsional spring 100 between the fixed and pivoted structures the spring will apply a spring force to the pivoted structure which progressively decreases as the pivoted structure is moved toward its second position. This spring force is continually applied to the pivoted structure through a fixed lever arm so that a spring torque is established which likewise diminishes as the pivoted structure moves towards its second position. It will be noted that only the bent ends 102 and 104 of the coil spring 100 contact the fixed and pivoted structures so that the radial forces of the spring are balanced with respect to the pivoted structure 68.

The forward portion of the pivoted structure 68 is formed with a rectangular recess 106 and the circular wall 92 of the pulley 88 is formed with a similarly shaped opening 108 at a position which can be registered with the recess 106. The recess 106 is provided to receive an installation tool (not shown) which enables the operator to dispose the belt tensioner 42 in operative engagement within the serpentine belt system 18. It will be noted that the belt 26 of the system 18 is of a size to be loosely trained about the pulleys 16, 22, 24, 26, 28, and 30. After the mounting bracket 44 has been fixedly installed on the engine frame 12, the installation tool is engaged within the square recess 106 and the pivoted structure 68 is then manually moved about the pivotal axis 80 in a direction toward the first position wherein the loosely trained belt 20 can be axially aligned with the belt engaging wall 94 of the pulley 88. When the installation tool is manually released, the spring torque acting on the pivoted structure 68 by virtue of the mounting of the torsional spring 100 causes the pivoted structure to move away from its first position and towards its second position into tensioning engagement with the belt 20. By suitable manipulation of the tool, an appropriate tension can be placed upon the belt which in turn applies a belt load torque to the pivoted structure 68 which is equal and opposite to the spring load torque. The belt load torque is produced by a belt load force corresponding with the belt load tension which acts on the pulley 88 in a direction toward the rotational axis 90 which bisects the angle of wrap of the belt 20 with respect to the pulley rim 94. As is conventional, the position of the angle of wrap is such that as the pulley moves toward the second position the lever arm to the pivotal axis 80 of the belt tensioner progressively diminishes. Consequently, the belt load torque is made to diminish with the spring torque as the pivoted structure moves towards its second position by virtue of the diminishing of the lever arm through which the belt load force acts, the belt load force itself being maintained generally constant corresponding with a generally constant tension in the belt. The position of the belt tensioner where the belt load torque is initially made equal to the spring torque constitutes an operative position of static equilibrium at which the pulley 88 and the belt tensioner 42 operates.

Moreover, it will be noted that the belt load force which acts through the ball bearing assembly 84 on the pivoted structure 68 in the aforesaid direction not only produces a torque about the pivotal axis of the pivoted structure but constitutes a linear force tending to move the peripheral bearing surface 66 of the pivoted structure 66 into engagement with the bearing surface 64 of the sleeve bearing 60. This force applied to the bearing structure is resisted by the fixed structure 46 by the establishment therein of a reactionary force which is equal and opposite to the belt load force. These two forces compress the adjacent portions of the bearing surfaces 66 and 64 into interengagement. This interengagement establishes a damping torque resistance to the pivotal movement of the pivoted structure 68 with respect to the fixed structure 46 which is a function of the magnitude of the forces, the radial distance of the surfaces 64 and 66 from the pivotal axis 80 and the coefficient of friction of the materials which form the surfaces 64 and 66.

It is desirable to limit the minimum size of the sleeve bearing 60 to one which will surround the ball bearing assembly 84. This relationship is desired since it enables the belt load force to be transmitted in an axially aligned position from the pulley 88 to the pivoted structure 68 and then to the sleeve bearing 60 so as to be distributed axially or uniformly to the sleeve bearing thereby enabling the bearing to wear evenly.

Since for any particular installation, the radial dimension of the bearing is fixed and the desired constant static belt load is fixed, the extent of the damping can be varied by choosing materials having a desired coefficient of friction. It will be understood that once the belt is set in motion by the operation of the engine the load characteristics of the various pulleys and instrumentalities driven thereby will cause dynamic changes in the belt tension which are reflected as dynamic changes in the belt load force applied to the pulley 88. An increase in the belt load force from the constant belt load force will result in a movement of the pivoted structure 68 in a direction toward its first position against the bias of the spring 100. A decrease in the belt load force will result in the spring force effecting a movement of the pivoted structure in a direction toward the second position. These movements will take place unless the aforesaid damping torque resistance is chosen to be sufficiently high to prevent such movements. It is within the contemplation of the present invention to choose the materials so that the coefficient of friction will permit movements of this type throughout the operation of the system. It is noted that the arrangement is such that the damping torque resistance is proportional to the belt load and hence the damping torque resistance will increase as the load force is increased above the constant static belt load force. On the other hand, while the damping torque resistance diminishes as the belt load diminishes below the constant static belt load force, the spring torque will not decrease to the same extent thus insuring a reducing damping torque resistance in the direction tending to tighten the belt.

Preferably, it is within the contemplation of the present invention to select materials which will have a static coefficient of friction which is sufficiently high to prevent movement within a range of belt load force changes. For example, in the serpentine system 18 illustrated in FIG. 1, an exemplary range is a range which is above −50% of the constant static belt load force. Exemplary materials which will achieve this coefficient of friction are Zytel for the sleeve bearing 60 and mild steel for the pivoted structure 68. With these materials so long as the surfaces 64 and 66 remain immobile and the reactionary force remains equal and opposite to the belt load force, any dynamic change in the belt load force which constitutes at least a reduction of 50% of the static belt load force will not have the effect of moving the pivoted structure 68.

As previously indicated, the operation of the internal combustion engine 10 is such as to impart vibratory forces to the engine frame 12. Since the bracket 44 is fixed to the engine frame 12 and to the fixed structure 46 of the belt tensioner 42, these vibratory forces are directly transmitted to the fixed structure of the belt tensioner. Since the pivoted structure 68 and pulley 88 are movably mounted with respect to the fixed structure 46, the vibratory forces acting on the fixed structure will dynamically change the magnitude of the reactionary force with respect to the belt load force. When the vibratory forces are such as to reduce the reactionary force so that the pressure between the surfaces 64 and 66 are relieved, the retained belt load force is sufficient to effect movements which would be otherwise prevented. Of course, only the component of the vibratory forces which act in the direction of the belt load forces would have a relative effect on the reactionary forces. The component of the vibratory forces which act in an axial direction can have the effect of disturbing the immobility between the two surfaces 64 and 66 by establishing small axial movements. Once the surfaces 64 66 are set into motion, the damping torque resistance now becomes a function of the dynamic coefficient of friction rather than the static coefficient of friction. It is well known that the dynamic coefficient of friction for dry surfaces is much less than the static coefficient of friction. It is within the contemplation of the present invention to set the damping torque resistance at a level which would permit movement any time the dynamic coefficient of friction comes into play rather than the static coefficient of friction. However, this level of resistance is less than the preferred level of −50% or greater. With this arrangement relative changes in the reactionary force magnitude with respect to the belt load force magnitude are required in order to effect release of the damping torque resistance to a point enabling pivotal movement to take place which would otherwise be prevented. This arrangement has the desirable effect of restricting the movements which can take place during operation to the instances of time that the vibratory forces are such as to effect release. The amount of movement during operation is therefore substantially reduced resulting in a reduction in wear and hence an increase in the useful like of the belt tensioner.

The vibratory forces which are produced by an internal combustion engine are a known factor and can be readily calculated. In order to establish a relative change in the reactionary force and the belt load force it is contemplated that the mass of the pivoted structure 68 and pulley 88 can be varied to accommodate or be in tune with the particular vibratory forces of the particular engine so as to achieve release. For example, where the internal combustion engine 10 is a General Motors model 3200 V−6, above −50% release can be achieved utilizing a pivoted structure and a pulley mass of 1 lb.

Figure 5:
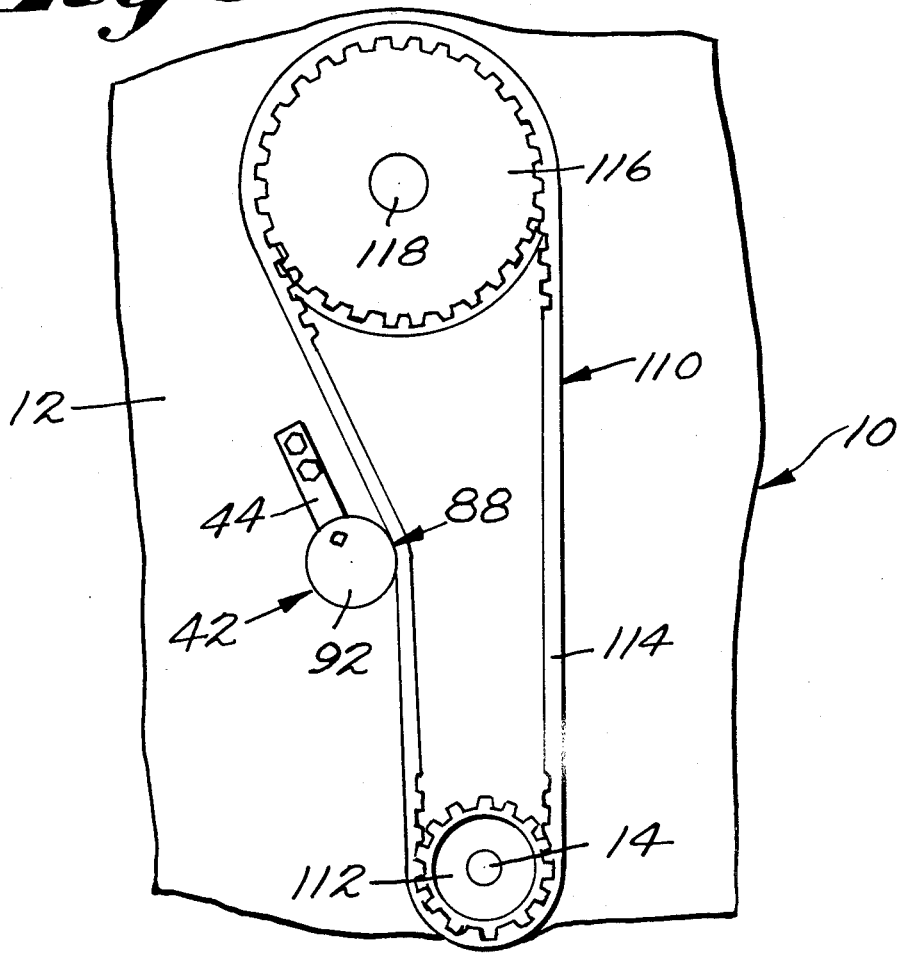
FIG. 5 is a fragmentary front elevational view illustrating a portion of an automotive internal combustion engine having a timing belt assembly including a belt tensioner embodying the principles of the present invention.

FIG. 5 illustrates a timing belt system, generally indicated at 110, for the internal combustion engine 10. In this system, a toothed pulley 112 is fixed to the output shaft 14 of the engine and an internally toothed belt 114 is driven by the pulley 112 and is trained about a second externally toothed pulley 116 fixed to a cam shaft 118 of the engine. As before, a bracket 44 serves to mount the belt tensioner 42 in operative tensioning relation with the belt 114.

In the tensioner 42 for the timing belt system 110 the variables are chosen such that the damping torque resistance will prevent movement when dynamic changes in the belt load force are within an even greater range than with the serpentine belt system 18 so as to provide a greater resistance to movement. Greater resistance is necessary to prevent tooth dislodgement on shut-off which presents the most severe change. With the timing belt 110, the range is greater than −80% of the static belt load force.

It will be understood that release of the damping torque resistance of the belt tensioner 42 when used in the timing belt system 110 is released in the same fashion as in the serpentine belt system 18 since the vibratory forces of the engine 10 in operation are sufficient to effect release.

Where the vibratory characteristics of some engines require undesirable extensive additions of mass to the pivoted structure and/or pulley, additional independent sources of vibration may be utilized to effect release without adding more weight. Such additional vibration sources are also useful when the belt system is driven by electric motors or other essentially non-vibratory prime movers.

Such an additional source of vibrational forces is shown in FIG. 6 in the form of an electrically operated vibratory mechanism, schematically illustrated at 120. As shown, the vibratory mechanism 120 is mounted on the stem 72 and adjacent portion of the member 70 of the pivoted structure 68 in offset relation from the position the belt load force and reactionary force oppose one another. It will be understood that the mechanism could be applied to the end of the stem 72 in which case the release would be effected solely by the change in the coefficient of friction function from static to dynamic in the manner previously indicated.

It thus will be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. The combination comprising
   an internal combustion engine including an engine frame subject to vibrational forces resulting from the operation of said internal combustion engine,
   a plurality of shafts mounted for rotational movement about parallel axes fixed with respect to said engine frame,
   a plurality of pulleys fixed to said plurality of shafts, one of said plurality of shafts constituting an output shaft of said internal combustion engine,
   an endless flexible belt of a size capable of being loosely trained about said plurality of pulleys, and
   a belt tensioner comprising
   a fixed structure fixed with respect to said engine frame,
   a pivoted structure,
   a belt tensioning pulley mounted on said pivoted structure for rotational movement about a rotational axis,
   said pivoted structure being mounted on said fixed structure for pivotal movement about a fixed pivotal axis parallel with said rotational axis between a first position and a second position,
   spring means for resiliently biasing said pivoted structure in a direction toward said second position with a spring torque which varies as the position of said pivoted structure approaches said second position so that said belt tensioning pulley is biased into an intermediate operating static equilibrium position in tensioning engagement with said belt wherein the spring torque is equal and opposite to a belt load torque which varies with the variation in the spring torque as the intermediate operation position approaches said second position due to belt elongation by maintaining the belt load force generally constant and varying a lever arm distance to said pivotal axis through which the belt load force acts,
   means for damping the pivotal movements of said pivoted structure as a result of dynamic belt load forces varying from the generally constant belt load force when the belt is moving,
   said damping means including sliding friction surface means for establishing a damping torque resistance sufficient to restrict the pivotal movements of said pivoted structure by virtue of the pressure of interengagement of said sliding friction surface means and the position of interengagement of said sliding friction surface means from said pivotal axis to an extent such that movements in response to dynamic changes in the belt load force within a range of changes are prevented,
   said damping means being operable in response to the vibrational forces to which said engine frame is subject to instantaneously release the damping torque resistance to a level permitting instantaneous pivotal movements in response to dynamic changes in the belt load force which would otherwise be prevented by said sliding friction surface means as being within said range of changes.

2. The combination as defined in claim 1 wherein said plurality of shafts includes a cam shaft forming a part of said internal combustion engine, said belt having teeth on a pulley engaging side thereof, all of said pulleys having exterior teeth meshingly engaging the belt teeth.

3. The combination as defined in claim 2 wherein said range of changes is a range above −80% of the constant belt load force.

4. The combination as defined in claim 3 wherein said pivoted structure is pivotally mounted on said fixed structure by a pivotal bearing means, said sliding friction surface means comprising a first bearing surface on said pivotal bearing means and a second bearing surface on one of said structures disposed in slidable engagement with said first bearing surface.

5. The combination as defined in claim 4 wherein said pivotal bearing means is a sleeve bearing surrounding said rotational axis.

6. The combination as defined in claim 5 wherein said belt tensioning pulley includes a cantilevered belt engaging wall axially overlapping and annularly surrounding said sleeve bearing.

7. The combination as defined in claim 6 wherein said belt tensioning pulley is rotationally mounted on said pivoted structure by a ball bearing assembly axially overlapped and annularly surrounded by said cantilevered belt engaging wall and said sleeve bearing.

8. The combination as defined in claim 1 wherein said plurality of shafts include a plurality of shafts connected with engine accessories and said belt is a thin serpentine belt.

9. The combination as defined in claim 8 wherein said range of changes is a range above −50% of the constant belt load force.

10. The combination as defined in claim 9 wherein said pivotal bearing means is a sleeve bearing surrounding said rotational axis.

11. The combination as defined in claim 10 wherein said belt tensioning pulley includes a cantilevered belt engaging wall axially overlapping and annularly surrounding said sleeve bearing.

12. The combination as defined in claim 11 wherein said belt tensioning pulley is rotationally mounted on said pivoted structure by a ball bearing assembly axially overlapped and annularly surrounded by said cantilevered belt engaging wall and said sleeve bearing.

13. The combination as defined in claim 1 wherein said pivoted structure is pivotally mounted on said fixed structure by a pivotal bearing means, said sliding friction surface means comprising a first bearing surface on said pivotal bearing means and a second bearing surface on one of said structures disposed in slidable engagement with said first bearing surface.

14. The combination as defined in claim 13 wherein said pivotal bearing means is a sleeve bearing surrounding said rotational axis.

15. The combination as defined in claim 14 wherein said belt tensioning pulley includes a cantilevered belt engaging wall axially overlapping and annularly surrounding said sleeve bearing.

16. The combination as defined in claim 15 wherein said belt tensioning pulley is rotationally mounted on said pivoted structure by a ball bearing assembly axially overlapped and annularly surrounded by said cantilevered belt engaging wall and said sleeve bearing.

17. A belt tensioner comprising
a fixed structure,
a pivoted structure,
a pulley mounted on said pivoted structure for rotational movement about a rotational axis,
means defining interengaging surfaces operatively associated with said structures arcuate about a fixed pivotal axis parallel with said rotational axis so as to slide relative to one another and define pivotal movements of said pivoted structure with respect to said fixed structure between a first position wherein said pulley can be transversely aligned with a loosely trained belt and a second position,
spring means for resiliently biasing said pivoted structure in a direction toward said second position with a spring torque which varies as the position of said pivoted structure approaches said second position permitting manual movement of said pulley into said first position against such resilient bias so that upon manual release the resilient bias moves said pulley into an intermediate operating static equilibrium position wherein the spring torque is equal and opposite to a belt load torque which varies with the variation in the spring torque as the intermediate operating position approaches said second position due to belt elongation by maintaining the belt load force acting on said pulley generally constant and varying a lever arm distance to said pivotal axis through which the belt load force acts,
said spring means being mounted with respect to said pivoted structure such that the resultant spring torque is balanced in a radial direction with respect to the pivotal axis,
the position of said pivotal axis and said rotational axis being so related to the position of engagement of said pulley with the belt when said tensioner is in operation that the belt load force transmitted to said pivoted structure is resisted by a reactionary force created in said fixed structure thereby compressing said interengaging surfaces together so as to establish a damping torque resistance which is a function of the fixed distance between said arcuate interengaging surfaces and said pivotal axis, the coefficient of friction with respect to the means defining said interengaging surfaces and the magnitude of said belt load and reactionary forces,
the means defining said interengaging surfaces having a design static coefficient of friction such that pivotal movements of said pivoted structure (1) in a direction toward said first position by the belt load torque as a result of dynamic increases in the belt load forces and (2) in a direction toward said second position by said spring torque as a result of dynamic decreases in said belt load force are prevented so long as the surfaces remain immobile with respect to one another and the reactionary force is of a magnitude above a predetermined percentage of said constant belt load force, the arrangement being such that vibratory forces independent of said dynamic belt load forces instantaneously release the damping torque resistance either by mobilizing the surfaces so as to reduce the coefficient of friction function from static to dynamic or reducing the reactionary force or both so as to enable instantaneous pivotal movements to take place which would otherwise be prevented.

18. A belt tensioner as defined in claim 17 wherein the magnitude of said predetermined percentage is −50%.

19. A belt tensioner as defined in claim 17 wherein the magnitude of said predetermined percentage is −80%.

20. A belt tensioner as defined in claim 17 wherein said means defining said interengaging surfaces comprises a sleeve bearing defining a first annular bearing surface constituting one of said interengaging surfaces and an annular portion on one of said structures defining a second annular bearing surface constituting the other of said interengaging surfaces.

21. A belt tensioner as defined in claim 20 wherein said sleeve bearing is cylindrical.

22. A belt tensioner as defined in claim 21 wherein said sleeve bearing is formed of Zytel.

23. A belt tensioner as defined in claim 20 wherein said pulley is mounted on said pivoted structure by rotational bearing means disposed in axially overlapped and annularly surrounded relation by said sleeve bearing.

24. A belt tensioner as defined in claim 21 wherein said pulley includes a cantilevered belt engaging wall axially overlapping and annularly surrounding said sleeve bearing.

25. A belt tensioner comprising
a fixed structure,
a pivoted structure,
a belt tensioning pulley mounted on said pivoted structure for rotational movement about a rotational axis,
said pivoted structure being mounted on said fixed structure for pivotal movement about a fixed pivotal axis parallel with said rotational axis between a first position wherein said pulley can be transversely aligned with a loosely trained belt,
spring means for resiliently biasing said pivoted structure in a direction toward said second position with a spring torque which varies as the position of said pivoted structure approaches said second position permitting manual movement of said pulley into said first position so that upon manual release the resilient bias moves said belt tensioning pulley into an intermediate operating static equilibrium position wherein the spring torque is equal and opposite to a belt load torque which varies with the variation in the spring torque as the intermediate operating position approaches said second position due to belt elongation by maintaining the belt load force generally constant and varying a lever arm distance to said pivotal axis through which the belt load force acts, means for damping the pivotal movements of said pivoted structure as a result of dynamic belt load forces varying from the generally constant belt load force when the belt is moving, said damping means including sliding friction surface means for establishing a damping torque resistance sufficient to restrict the pivotal movements of said pivoted structure by virtue of the pressure of interengagement of said sliding friction surface means from said pivotal axis to an extent such that movements in response to dynamic changes in the belt load force about $-50\%$ of the constant belt load force are prevented, and means operable in response to vibrational forces independent of the dynamic belt load forces for instantaneously releasing the damping torque resistance to a level permitting instantaneous pivotal movements in response to dynamic changes in the belt load force which would otherwise be prevented by said sliding friction surface means as being within said range of changes.

26. A belt tensioner as defined in claim 25 wherein said damping torque resistance releasing means comprises the mass of said pivoted structure and pulley, said mass being interrelated with the vibrational forces of an internal combustion engine driving the belt tensioned by said belt tensioner.

27. A belt tensioner as defined in claim 25 wherein said damping torque resistance releasing means comprises an electrically operated vibrating assembly fixed to said pivoted structure.

28. A belt tensioner comprising a fixed structure including a fixed pivotal bearing portion defining a fixed pivotal bearing surface arcuate about a fixed pivotal axis, said fixed pivotal bearing portion extending in cantilevered fashion in one axial direction, a pivoted structure including a movable pivotal bearing portion having a movable pivotal bearing surface disposed in axially lapped opposed relation with respect to said fixed pivotal bearing surface and a pivoted annular bearing portion defining a rotational axis parallel with said pivotal axis, a pulley including a radially extending wall, an annular belt engaging wall concentric with said rotational axis and extending axially from an outer portion of said radially extending wall in cantilevered fashion in an axial direction opposed to said one axial direction and a rotational annular bearing portion concentric with said rotational axis extending axially from an inner portion of said radially extending wall in cantilevered fashion in said opposed axial direction and in axially lapped opposed relation with respect to said pivoted annular bearing portion, rotational bearing means between said annular bearing portions mounting said pulley on said pivoted structure for rotational movement about said rotational axis, pivotal bearing means between said fixed and movable pivotal bearing surfaces mounting said pivoted structure on said fixed structure for pivotal movement about said fixed pivotal axis between a first position wherein said pulley can be transversely aligned with a loosely trained belt and a second position, spring means for resiliently biasing said pivoted structure in a direction toward said second position with a spring torque which varies as the position of said pivoted structure approaches said second position permitting manual movement of said pulley into said first position against such resilient bias so that upon manual release the resilient bias moves said pulley into an intermediate operating static equilibrium position wherein the spring torque is equal and opposite to a belt load torque which varies with the variation in the spring torque as the intermediate operating position approaches said second position due to belt elongation by maintaining the belt load force acting on said pulley generally constant and varying a lever arm distance to said pivotal axis through which the belt load force acts, said pivotal bearing means having exterior and interior bearing surfaces engaging said fixed and movable pivotal bearing surfaces, said exterior and interior bearing surfaces being disposed in an annular plane surrounding said rotational bearing means and said annular bearing portions, said belt engaging annular wall extending in axially lapped surrounding relation with respect to said pivotal bearing means and said rotational bearing means such that the belt load force acting on said pulley is transmitted to said pivoted structure through said rotational bearing means so as to establish a belt load force in said pivoted structure opposed by an equal and opposite reactionary force in said fixed structure transmitted to said pivotal bearing means in an axially balanced fashion.

29. A belt tensioner as defined in claim 28 wherein said rotational bearing means is a ball bearing assembly and said pivotal bearing means is a sleeve bearing.

30. A belt tensioner as defined in claim 29 wherein said sleeve bearing is cylindrical.

31. A belt tensioner as defined in claim 30 wherein said sleeve bearing is formed of Zytel.

32. A belt tensioner as defined in claim 31 wherein one of said exterior and interior bearing surfaces of said pivotal bearing means is slidable with respect to the bearing surface engaged thereby, said belt load and reactionary forces compressing said one bearing surface and the surface engaged thereby together establishing a damping torque resistance which is also a function of the distance of said compressed bearing surfaces from said pivotal axis and the coefficient of friction of the materials forming the compressed bearing surfaces.

33. A belt tensioner as defined in claim 27 wherein one of said exterior and interior bearing surfaces of said sleeve bearing is slidable with respect to the bearing surface engaged thereby, said belt load and reactionary forces compressing said one bearing surface and the surface engaged thereby together establishing a damping torque resistance which is also a function of the distance of said compressed bearing surfaces from said pivotal axis and the coefficient of friction of the materials forming the compressed bearing surfaces.

34. A belt tensioner as defined in claim 33 wherein said spring means is mounted with respect to said pivoted structure such that the resultant spring torque is balanced in a radial direction with respect to the pivotal axis.

35. A belt tensioner comprising a fixed structure including a fixed annular bearing portion defining a fixed annular bearing surface arcuate about a fixed pivotal axis, a pivoted structure including a movable pivotal bearing portion having a movable annular bearing surface disposed in axially lapped opposed relation with respect to said fixed annular bearing surface, a pulley rotational bearing means mounting said pulley on said pivoted structure for rotational movement about a rotational axis parallel with said fixed pivotal axis, an annular sleeve bearing between said fixed and movable annular bearing surfaces mounting said pivoted structure on said fixed structure for pivotal movement about said fixed pivotal axis between a first position wherein said pulley can be transversely aligned with a loosely trained belt and a second position, spring means for resiliently biasing said pivoted structure in a direction toward said second position with a spring torque which varies as the position of said pivoted structure approaches said second position permitting manual movement of said pulley into said first position against such resilient bias so that upon manual release the resilient bias moves said pulley into an intermediate operating static equilibrium position wherein the spring torque is equal and opposite to a belt load torque which varies with the variation in the spring torque as the intermediate operating position approaches said second position due to belt elongation by maintaining the belt load force acting on said pulley generally constant and varying a lever arm distance to said pivotal axis through which the belt load force acts, said sleeve bearing having exterior and interior annular bearing surfaces engaging said fixed and movable annular bearing surfaces, all of said bearing surfaces encircling said rotational axis and having a radius dimension greater than the radius dimension of said rotational bearing means.

36. A belt tensioner as defined in claim 35 wherein one of said exterior and interior annular bearing surfaces being slidable with respect to the bearing surfaces engaged thereby, said slidable bearing surfaces providing dominant damping torque resistance to the pivotal movement of said pivoted structure.

37. A belt tensioner as defined in claim 36 wherein said spring means is mounted with respect to said pivoted structure such that the resultant spring torque is balanced in a radial direction with respect to the pivotal axis.

38. A belt tensioner as defined in claim 35 wherein said rotational bearing means is disposed in axially overlapped and annularly surrounded relation by said sleeve bearing.

39. A belt tensioner as defined in claim 38 wherein said pulley includes a cantilevered belt engaging wall axially overlapping and annularly surrounding said sleeve bearing.

* * * * *

UNITED STATES PATENT AND TRADEMARK OFFICE
CERTIFICATE OF CORRECTION

PATENT NO. : 4,824,421
DATED      : April 25, 1989
INVENTOR(S) : Jacek S. Komorowski It is certified that error appears in the above-identified patent and that said Letters Patent is hereby corrected as shown below:

Column 15, line 18, change "about" to --above--.

Signed and Sealed this

Fourth Day of May, 1993

*Attest:*

MICHAEL K. KIRK

*Attesting Officer*    Acting Commissioner of Patents and Trademarks